United States Patent
Leonard et al.

[11] 3,806,727
[45] Apr. 23, 1974

[54] OPTICAL DETECTOR SYSTEM

[75] Inventors: Donald A. Leonard, Stoneham; Chin H. Chang, Melrose, both of Mass.

[73] Assignee: Avco Everett Research Laboratory Inc., Everett, Mass.

[22] Filed: May 11, 1973

[21] Appl. No.: 359,482

[52] U.S. Cl.................. 250/301, 250/373, 250/345
[51] Int. Cl............................................. G01t 1/00
[58] Field of Search ........... 250/301, 304, 339, 345, 250/432, 373

[56] References Cited
UNITED STATES PATENTS

| | | |
|---|---|---|
| 3,497,690 | 2/1970 | Wheeless et al..................... 250/304 |
| 3,510,648 | 5/1970 | Leger................................. 250/301 |
| 3,597,616 | 8/1971 | Brunton............................. 250/345 |
| 3,652,850 | 3/1972 | Briggs............................... 250/345 |
| 3,710,111 | 1/1973 | Collura.............................. 250/373 |

*Primary Examiner*—Archie R. Borchelt
*Assistant Examiner*—Harold A. Dixon
*Attorney, Agent, or Firm*—Charles M. Hogan; Irwin P. Garfinkle

[57] ABSTRACT

The oil pollution content of water is continuously monitored by measuring the oil fluorescence spectrum produced by an ultraviolet light source and by comparing it with the Raman spectrum of water.

15 Claims, 2 Drawing Figures

OPTICAL DETECTOR SYSTEM

BACKGROUND OF THE INVENTION

There is a recognized need for measuring oil and other pollutants in discharged wastewater and other media. In most instances samples of the polluted medium are taken and then analyzed at a later time. The present invention provides a continuous, real time monitoring system which analyzes a polluted medium in situ. In the known prior art systems for analyzing the pollution of a medium, the measurements must be calibrated against a standard. The present invention provides a system which is dynamically self-calibrating.

The present invention has broad application for the detection of various types of impurities, but it has primary application in the continuous monitoring of the pollution level of a medium flowing through a pipe.

It is well known that ships carrying oil as a cargo or as a fuel, refill their emptied tanks with ballast water. When the ballast water is discharged as wastewater, the total amount of oil discharged in the wastewater can create a significant ecological problem which the present invention seeks to eliminate. This system is capable of monitoring trace oil in the discharged water. By trace oil is meant ten to one thousand parts per million of oil in water.

The prior art teaches two categories of oil pollution identification systems: (1) passive tagging and (2) active tagging. Passive tagging involves the identification of the oil pollutant by its natural chemical or physical characteristics. In active tagging some known or readily identifiable material is added to the oil.

The physical chemical methods of monitoring the oil content of water include gas chromatography, mass spectrometry and methods involving solvent extraction, infrared isotope ratios and trace metals. None of these methods are readily applicable to the detection and monitoring of shipboard waste-water oil because each requires a higher signal than that which is available from trace oil. These methods are further complicated by the fact that different types of oils are used on board ship.

The present invention utilizes an optical method which has the advantages of being fast, direct, and highly sensitive if proper exciting light source and characteristical oil signals are chosen.

SUMMARY OF THE INVENTION

The disclosed invention involves the optical excitation of oil-polluted wastewater by a light source, and the comparing of the fluorescence signal from aromatic molecules in oil with the Raman signal of the water. It will be seen that the use of the Raman signal of the water provides a sytem which is self-calibrating. The light source may be a laser, but simpler sources, such as an ultraviolet lamp, are also used. The invention is particularly useful in measuring trace levels of oil in water since the technique is highly sensitive to oil concentrations in the range of 10 to 50 parts per million (ppm). The sensitivity decreases substantially in the concentration range of 50 to 1,000 ppm, and is relatively insensitive to concentrations of more than 1,000 ppm.

The invention uses the established optical characteristics of water and certain pollutants known to be in the wastewater. The wastewater is excited by a light source having a given wavelength and the Raman energy of the water at another particular wavelength and the fluorescence of the pollutant at another are measured. The ratios of the two measured energy levels provide a calibrated indication of the content of oil in the water.

THE DRAWINGS

DESCRIPTION OF THE ILLUSTRATED EMBODIMENT

Figure 1:
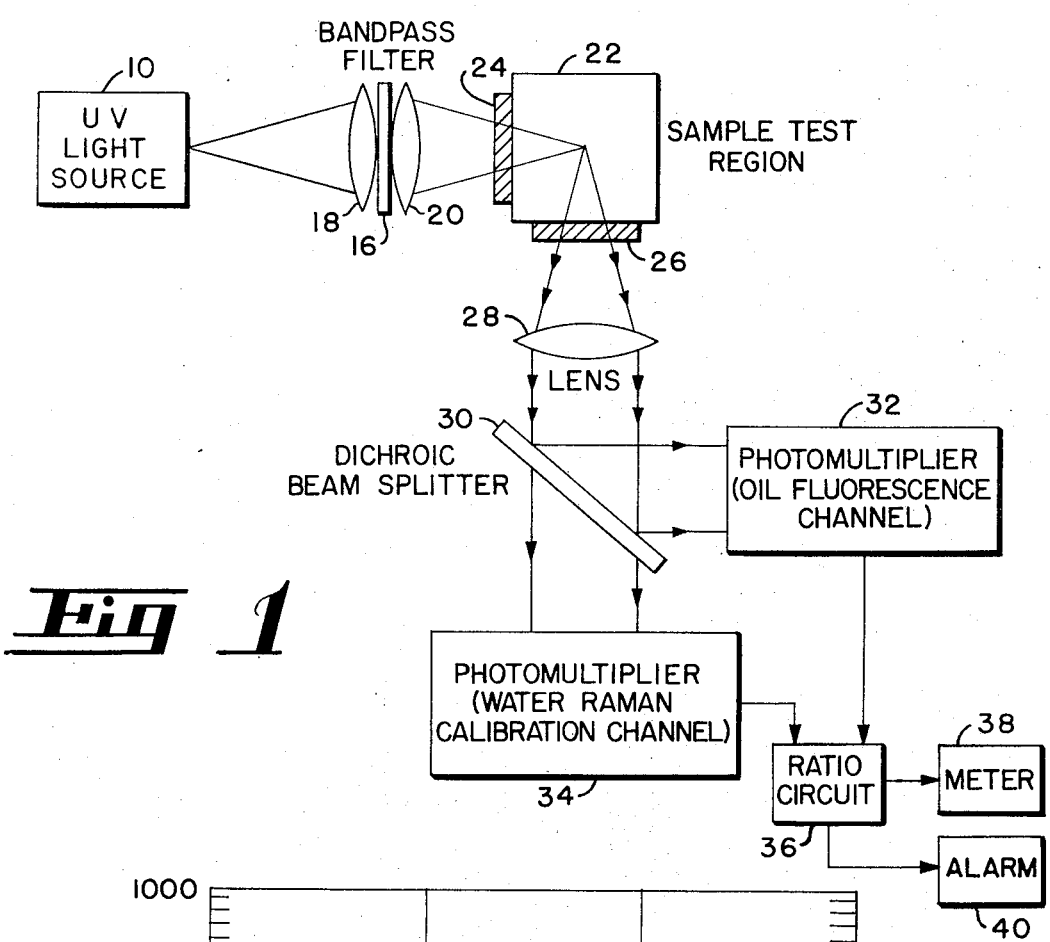
FIG. 1 is a schematic of an operable embodiment of this invention.

As shown in FIG. 1, a conventional ultraviolet light source 10 is used to generate appropriate light energy. For example, the source 10 may be a conventional mercury arc lamp energized from a 60 herz source. In that case the light emissions will have strong lines centered near 3,660 A. Alternatively, the ultraviolet light source may be a laser having strong emissions centered at 3,371 A. In any case, the light emissions are filtered by band-pass filter 16 having a band-pass equal to or less than the width of the Raman spectrum for water and is focused by means of lenses 18 and 20 into a pipe 22 through which oil-polluted water is flowing. The pipe 22 is provided with an entry window 24 for admitting the filtered light emissions and with an exit window 26 positioned at an angle of 90 degrees with respect to the window 24.

The scattered and re-emitted light is collected through the 90 degree exit window 26 so that the oil-polluted water flowing through the pipe 22 is the only element which is common to both the transmitter and receiver optics. The re-emitted light spectrum from the window 26 is focused through a lens 28 onto a dichroic beam splitter 30. The beam splitter 30 is coated so that it divides the re-emitted light into two wavelength channels, one channel for oil fluorescence spectrum, and one channel for water Raman spectrum. The oil fluorescence spectrum is applied to a photomultiplier 32, the output voltage of which is a measure of the intensity of the energy of the oil fluorescence spectrum. The water Raman spectrum is applied to a photomultiplier 34, the output voltage of which is a measure of the intensity of the energy of the water Raman. Both output voltages are applied to a ratio circuit 36 having two output circuits. The first output circuit is applied to a meter 38 calibrated to indicate the ratio of the intensity of oil fluorescence to the intensity of water Raman. The other output from ratio circuit 36 is to an alarm 40 which serves to provide an appropriate warning whenever the ratio of the energy of the oil fluorescence to the water Raman exceeds a predetermined level.

If the light source is a mercury lamp, it has an output band centered at approximately 3,660 A, and its power level is determined by the accuracy required for the system. The wave-length of the water Raman transmitted through the dichroic beam splitter 30 is centered at approximately 4,170 A, while the wavelength of the oil fluorescence transmitted through the dichroic beam splitter 30 is centered at approximately 3,800 A. While the above specified wavelengths may be suitable for a particular application, it will be recognized that other wave-lengths may be preferable under different circumstances and for different types of oil or other pollutants. Where the light source is a laser, the strong lines are centered at 3,371 A while the wavelength of the water Raman and oil fluorescence are centered at 3,800 A and 4,000 A, respectively.

Figure 2:
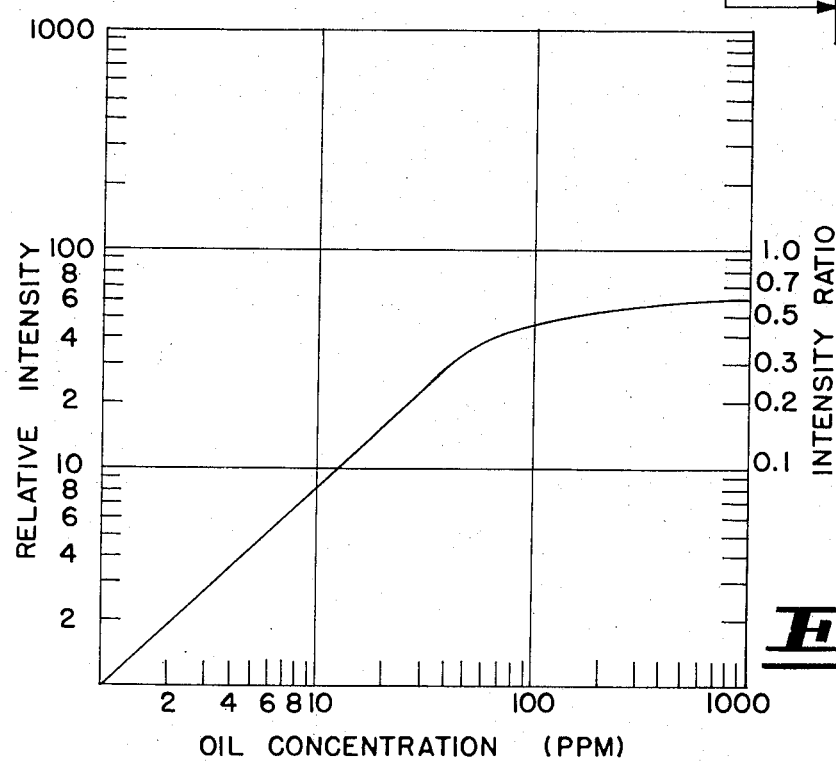
FIG. 2 is a curve showing the ratio of the intensity of the Raman spectrum of water at 3,800 A to the intensity of the fluorescence spectrum of oil at 4,000 A using a 3,371 A laser light source.

The particular spectra were selected by measuring the water Raman and oil fluorescence for different contents of oil and by noting that for most types of oils found on board ship (for example, light crude medium detergent lubricating oil, diesel oil and bunker C fuel oil) there is a linear relationship between the oil content and the ratio of the oil fluorescence to the water Raman until the level of oil exceeds 50 parts per million. Thereafter the ratio does not increase at a linear rate and the system becomes practically insensitive to changes above 1,000 parts per million. This relationship is shown in the curve of FIG. 2.

While the system has been designed for detecting the amount of oil in water, it may also be used for detection of other pollutants so long as the ratio of the spectra can be calibrated at a meaningful level. In the instant case, the levels are calibratable from 10 to 1,000 parts per million. In other cases, higher or lower pollutant concentrations may be monitored.

Further, while the illustrated embodiment of the invention utilizes an ultraviolet mercury arc lamp, it is also within the scope of this invention to use a laser or other light source. The principal requirement for the light source is that it be located in the ultraviolet region of the spectrum such that oil fluorescence can be excited.

We claim:

1. An optical system for monitoring the level of a pollutant in a fluid medium, the combination comprising:

a source of light energy, said source having a spectrum centered at a first predetermined wavelength;

means for directing said source of light energy into said polluted medium;

means for collecting the scattered energy from said polluted medium at a second predetermined wavelength, the energy level at said second predetermined wavelength being primarily due to the scattered energy from said medium;

means for collecting the scattered energy from said polluted medium at a third predetermined wavelength, the energy level at said third predetermined wavelength being primarily due to the scattered energy from said pollutant; and means for comparing the level of the collected energy at said third predetermined wavelength with the level of the energy collected at said second predetermined wavelength.

2. The invention as defined in claim 1 wherein said medium is water and said pollutant is oil.

3. The invention as defined in claim 2 wherein said energy at said second frequency is due primarily to the scattered Raman of said water, and the energy at said third wavelength is due primarily to the fluorescence of said oil.

4. The invention as defined in claim 3 wherein said source is in the ultraviolet wavelength region.

5. The invention as defined in claim 4 wherein said source is a mercury arc lamp and said first predetermined wavelength is approximately 3,660 A, said second predetermined wavelength is approximately 4,170 A, and said third predetermined wavelength is approximately 3,800 A.

6. The invention as defined in claim 4 wherein said source is a laser, and wherein said first predetermined wavelength is approximately 3,371 A, said second predetermined wavelength is approximately 3,800 A, and said third predetermined wavelength is approximately 4,000 A.

7. The invention as defined in claim 2 wherein said means for comparing the levels of energy at said second and third wavelengths comprises means for determining the ratio of the energy at said third wavelength to the energy at said second wavelength.

8. The invention as defined in claim 1 wherein said polluted medium is contained in a conduit.

9. The invention as defined in claim 8 wherein said conduit is provided with an entry window for admitting said light source, and an exit window oriented 90 degrees from said entry window, said scattered energy being collected through said exit window.

10. The invention as defined in claim 9 wherein said medium is water and said pollutant is oil.

11. The invention as defined in claim 10 wherein said source is in the ultraviolet wavelength region.

12. The invention as defined in claim 11 wherein said source is a mercury arc lamp, and wherein said first predetermined wave-length is approximately 3,660 A, said second predetermined wave-length is approximately 4,170 A, and said third predetermined wavelength is approximately 3,800 A.

13. The invention as defined in claim 12 wherein said means for comparing the levels of energy at said second and third wavelengths comprises means for determining the ratio of the energy at said third wavelength to the energy at said second wavelength.

14. The invention as defined in claim 11 wherein said source is a laser and wherein said first predetermined wavelength is approximately 3,371 A, said second predetermined wavelength is approximately 3,800 A, and said third predetermined wavelength is approximately 4,000 A.

15. The invention as defined in claim 14 wherein said means for comparing the levels of energy at said second and third wavelengths comprises means for determining the ratio of the energy at said third wavelength to the energy at said second wavelength.

* * * * *